(12) United States Patent
Miyamoto et al.

(10) Patent No.: US 8,576,891 B2
(45) Date of Patent: Nov. 5, 2013

(54) GAS LASER OSCILLATOR AND GAS EXCHANGE METHOD FOR GAS LASER OSCILLATOR

(75) Inventors: Naoki Miyamoto, Tokyo (JP); Mototoshi Kumaoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/878,911

(22) PCT Filed: Sep. 13, 2011

(86) PCT No.: PCT/JP2011/070899
§ 371 (c)(1),
(2), (4) Date: Apr. 11, 2013

(87) PCT Pub. No.: WO2012/053298
PCT Pub. Date: Apr. 26, 2012

(65) Prior Publication Data
US 2013/0186476 A1    Jul. 25, 2013

(30) Foreign Application Priority Data

Oct. 19, 2010  (JP) .................................. 2010-234968

(51) Int. Cl.
*H01S 3/20*  (2006.01)
(52) U.S. Cl.
USPC .................. 372/59; 372/57; 372/55

(58) Field of Classification Search
USPC ............................................... 372/59, 57, 55
See application file for complete search history.

(56) References Cited

U.S. PATENT DOCUMENTS 5,088,101  A  *  2/1992  Irie et al. ...................... 372/59
2006/0239322  A1 *  10/2006  Matsunaga et al. ............. 372/58

FOREIGN PATENT DOCUMENTS

| JP | 02-065187 A | 3/1990 |
| JP | 02-100384 A | 4/1990 |
| JP | 02-130981 A | 5/1990 |
| JP | 11-008426 A | 1/1999 |
| JP | 2006-303174 A | 11/2006 |

* cited by examiner

*Primary Examiner* — Kinam Park
(74) *Attorney, Agent, or Firm* — Sughrue Mion, PLLC

(57) ABSTRACT

The sealed gas laser oscillator that includes the airtight vessel, the laser gas supply source that supplies a laser gas to the airtight vessel, and the vacuum pump that performs evacuation until a pressure of an inside of the airtight vessel reaches a target reached pressure every predetermined interval between laser gas exchanges and is connected to the airtight vessel, and that performs laser oscillation in a state where the airtight vessel is filled with the laser gas. The gas laser oscillator includes a unit that determines the target reached pressure on the basis of the interval between laser gas exchanges, a leakage rate of an impurity gas from the outside to the airtight vessel after evacuation, and an allowable impurity gas pressure at which the gas laser oscillator is capable of being operated.

6 Claims, 4 Drawing Sheets

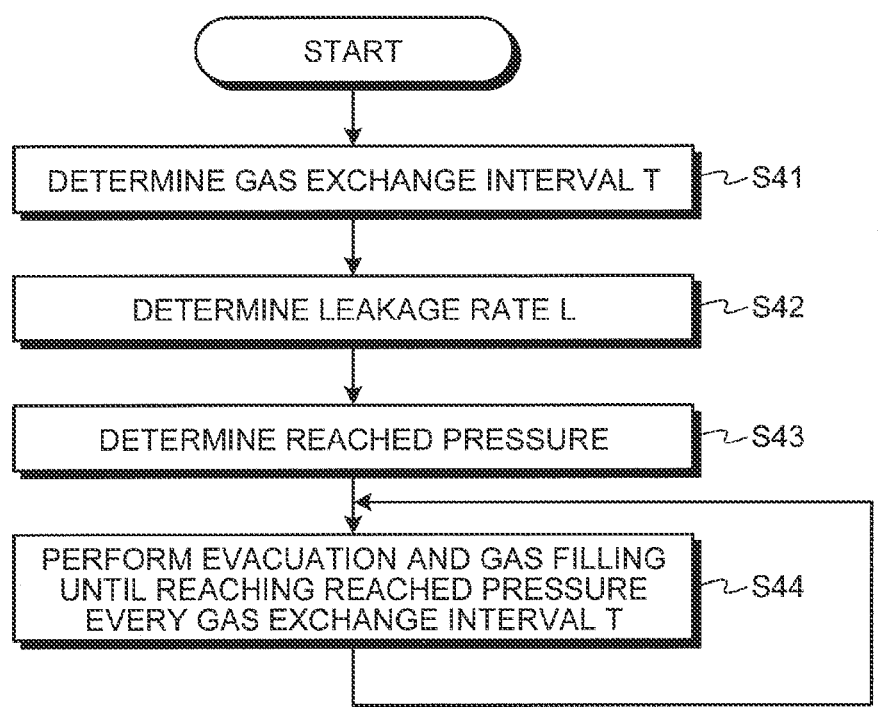

GAS LASER OSCILLATOR AND GAS EXCHANGE METHOD FOR GAS LASER OSCILLATOR

CROSS-REFERENCE TO RELATED APPLICATION

This is a National Stage Entry of Application No. PCT/JP2011/070899 filed Sep. 13, 2013, claiming priority based on Japanese Patent Application No. 2010-234968 filed Oct. 19, 2010, the contents of all of which are incorporated herein by reference in their entirety.

FIELD

The present invention relates to a gas laser oscillator capable of performing a gas exchange in a short time and a gas exchange method for the gas laser oscillator, in a gas laser oscillator in which gas is used as a laser medium.

BACKGROUND

In the case of sealed gas ($CO_2$) laser oscillators, it is necessary to perform a gas exchange at regular intervals due to degradation of the laser medium gas and reduction in the gas purity due to inflow of external air leaking into the housing. In the conventional gas exchange for the sealed laser oscillator, evacuation is performed from the set pressure at the time of oscillation to 0.1 to 0.01 Torrs regardless of the frequency of gas exchanges (for example, see Patent Literature 1).

CITATION LIST

Patent Literature

Patent Literature 1: Japanese Patent Application Laid-open No. 02-65187

SUMMARY

Technical Problem

However, according to the above-described conventional technology, in a gas exchange for the sealed laser oscillator, a gas exchange is performed at regular intervals regardless of the time and date of the last gas exchange and the situation such as the housing being open to the atmosphere during maintenance immediately before a gas exchange; therefore, it is necessary to perform evacuation from the set pressure (for example, 55 Torrs) at the time of oscillation to 0.1 to 0.01 Torrs. Thus, there is a problem in that it takes time to perform evacuation.

The present invention is achieved in view of the above and has an object to provide a gas laser oscillator capable of performing a gas exchange in a short time and a gas exchange method for the gas laser oscillator.

Solution to Problem

There is provided a gas laser oscillator according to an aspect of the present invention that is a sealed gas laser oscillator including an airtight vessel, a laser gas supply source that supplies a laser gas to the airtight vessel, and a vacuum pump that is connected to the airtight vessel and performs evacuation until a pressure of an inside of the airtight vessel reaches a target reached pressure every predetermined interval between laser gas exchanges and, and that performs laser oscillation in a state where the airtight vessel is filled with the laser gas, the gas laser oscillator including: a unit that determines the target reached pressure on a basis of the interval between laser gas exchanges, a leakage rate of an impurity gas from an outside to the airtight vessel after evacuation, and an allowable impurity gas pressure at which the gas laser oscillator is capable of being operated.

Advantageous Effects of Invention

According to the present invention, an effect is obtained where the laser gas exchange time is shortened for a sealed gas laser oscillator.

BRIEF DESCRIPTION OF DRAWINGS

FIG. 4 is a flowchart illustrating a laser gas exchange method according to the first embodiment.

DESCRIPTION OF EMBODIMENTS

Embodiments of a gas laser oscillator and a gas exchange method for the gas laser oscillator according to the present invention will be described in detail below with reference to the drawings. The present invention is not limited to these embodiments.

First Embodiment

Figure 1:
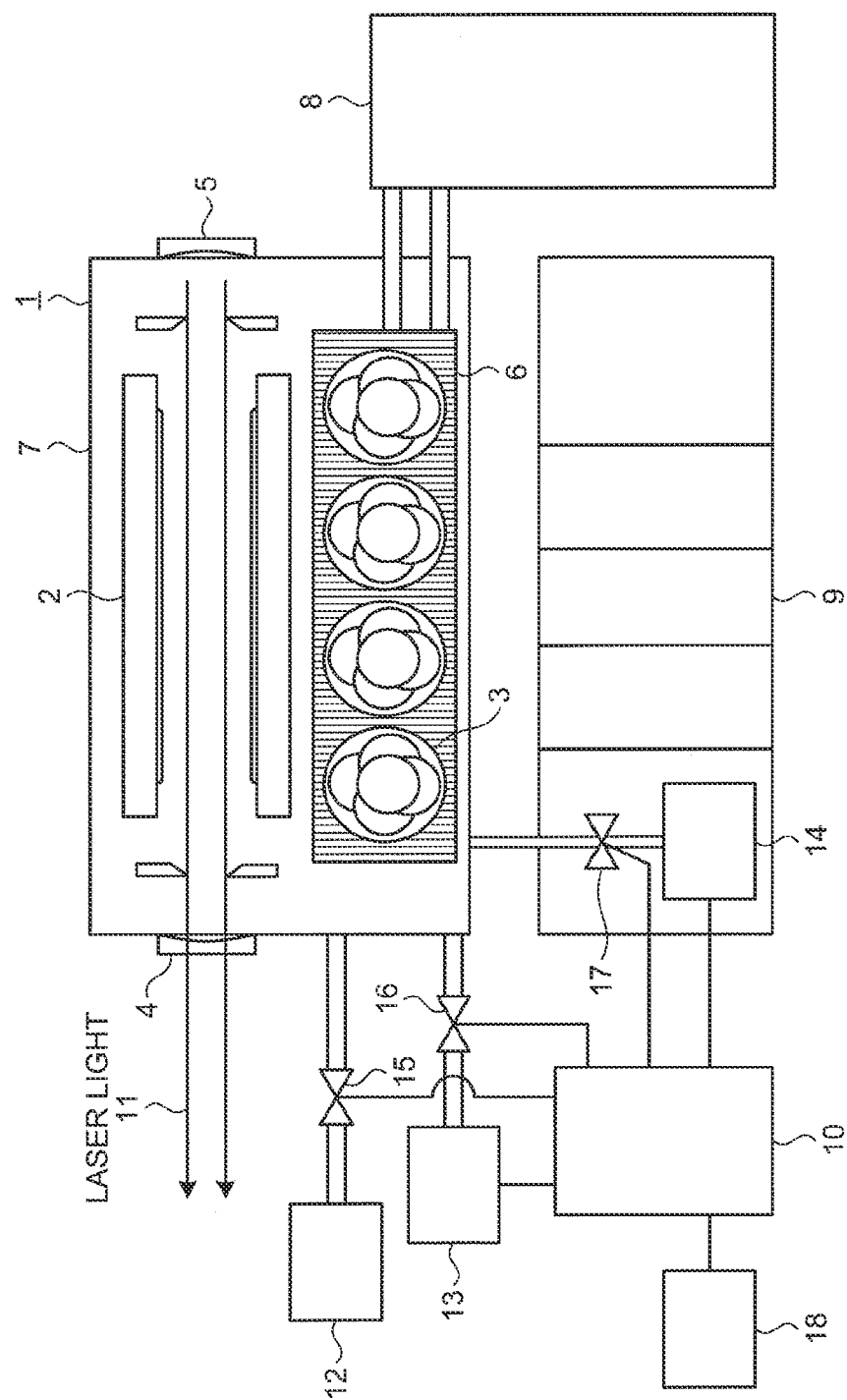
FIG. 1 is a diagram illustrating the configuration of a gas laser oscillator in first and second embodiments according to the present invention.

FIG. 1 is a diagram illustrating the configuration of a gas laser oscillator 1 in the first embodiment according to the present invention. The gas laser oscillator 1 is a sealed gas laser oscillator and includes a discharge electrode 2, a gas circulation blower 3 that circulates the laser gas in the gas laser oscillator 1, a partial reflection mirror 4 that reflects part of laser light 11 and transmits the rest of the laser light 11 therethrough, a total reflection mirror 5 that totally reflects the laser light 11, and a heat exchanger 6 that exchanges heat to control the temperature of the laser gas.

The gas circulation blower 3, the discharge electrode 2, and the heat exchanger 6 are provided in a vacuum vessel 7 (airtight vessel) of the gas laser oscillator 1. When the gas laser oscillator 1 is operated, the vacuum vessel 7 is filled with a laser gas, such as $CO_2$, for example, at about $\frac{1}{15}$ to $\frac{1}{10}$ atmospheres (55 to 65 Torrs) and laser oscillation occurs in the vacuum vessel 7.

Moreover, the gas laser oscillator 1 includes a temperature control unit 8 and the temperature control unit 8 has a function of controlling the temperature of the partial reflection mirror 4, the total reflection mirror 5, the heat exchanger 6, the discharge electrode 2, and the like by sending cooling water (heating water) to each component.

Furthermore, the gas laser oscillator 1 includes a power panel 9, in which are accommodated equipment (not shown) that causes the discharge electrode portion 2 to generate a discharge, equipment (not shown) that controls the gas circulation blower 3, a vacuum pump 14 that has a function of evacuating the vacuum vessel 7 filled with a laser gas for laser oscillation, and the like.

Furthermore, the gas laser oscillator 1 includes a laser gas supply source 12 and a pressure gauge 13. The laser gas supply source 12 is, for example, a gas cylinder that supplies a laser gas (for example, $CO_2$) to the vacuum vessel 7. The pressure gauge 13 measures the pressure in the vacuum vessel 7. Valves 15, 16, and 17 are provided between the vacuum vessel 7 and the laser gas supply source 12, the pressure gauge 13, and the vacuum pump 14, respectively. The gas laser oscillator 1 includes a control unit 10 that controls the operations of the gas laser oscillator 1. The control unit 10 can control the laser gas supply source 12, the vacuum pump 14, and the like on the basis of the measurement results from the pressure gauge 13 or the like. Furthermore, an input terminal 18, which can be operated by a user, is connected to the control unit 10. Moreover, a storing unit (not shown) is included in the control unit 10 or the input terminal 18.

In the sealed gas laser oscillator 1, an impurity gas pressure Pd in the housing (the vacuum vessel 7) immediately before a laser gas exchange can be represented by the following Equation (1):

$$Pd = L \times T + Pdl \qquad (1)$$

where L (Torr/Hr) is the amount of leakage of the impurity gas entering the vacuum vessel 7 from the outside per unit time, i.e., the leakage rate, T (Hr) is the interval between laser gas exchanges, and Pdl (Torr) is the target reached pressure by evacuation by the vacuum pump 14 when a laser gas exchange was performed last time, i.e., the pressure of the impurity gas (mainly air) remaining in the oscillator housing (the vacuum vessel 7) after evacuation.

An allowable impurity gas pressure Pdth, which is the allowable limit of an impurity gas that affects the characteristics of the gas laser oscillator 1, is determined depending on the internal structure of the vacuum vessel 7, the output of the laser light, and the like, which are different for each gas laser oscillator. The allowable impurity gas pressure Pdth (Torr) is the maximum allowable pressure of an impurity gas, at which the gas laser oscillator 1 can be operated. The leakage rate L can be measured by the pressure gauge 13. Moreover, the impurity gas pressure Pdl in the vacuum vessel 7 after evacuation can be obtained by the pressure gauge 13 to measure the reached pressure by evacuation at the time of a laser gas exchange. In other words, the pressure gauge 13 indicates the pressure including residual laser gas; therefore, the impurity gas pressure Pdl is obtained as a partial pressure value thereof.

Accordingly, if the time period is determined for which the gas laser oscillator 1 is continuously used after a laser gas exchange, and the shortest interval T between gas exchanges within the range of the time period described above is determined, it is possible to determine the highest target reached pressure Pdl of the impurity gas under the condition that Pd≤Pdth is satisfied. Consequently, a gas exchange can be performed in a shorter time without degrading the performance of the gas laser oscillator 1.

The above description will be explained in detail with reference to the graph showing the time (Hr) variation in the amount of an impurity gas (Torr) illustrated in FIG. 2. If the leakage rate L in Equation 1 is constant, as illustrated by the dotted-line graph in FIG. 2, when the gas exchange interval T is long, L×T becomes large. Therefore, in order to make Pd in Equation 1 satisfy Pd≤Pdth, it is necessary to perform evacuation by the vacuum pump 14 until the pressure in the vacuum vessel 7 reaches about 0.1 to 0.01 Torrs in order to reduce the target reached pressure Pdl of the impurity gas after evacuation. Typically, it takes about 30 minutes to perform this evacuation.

Figure 2:
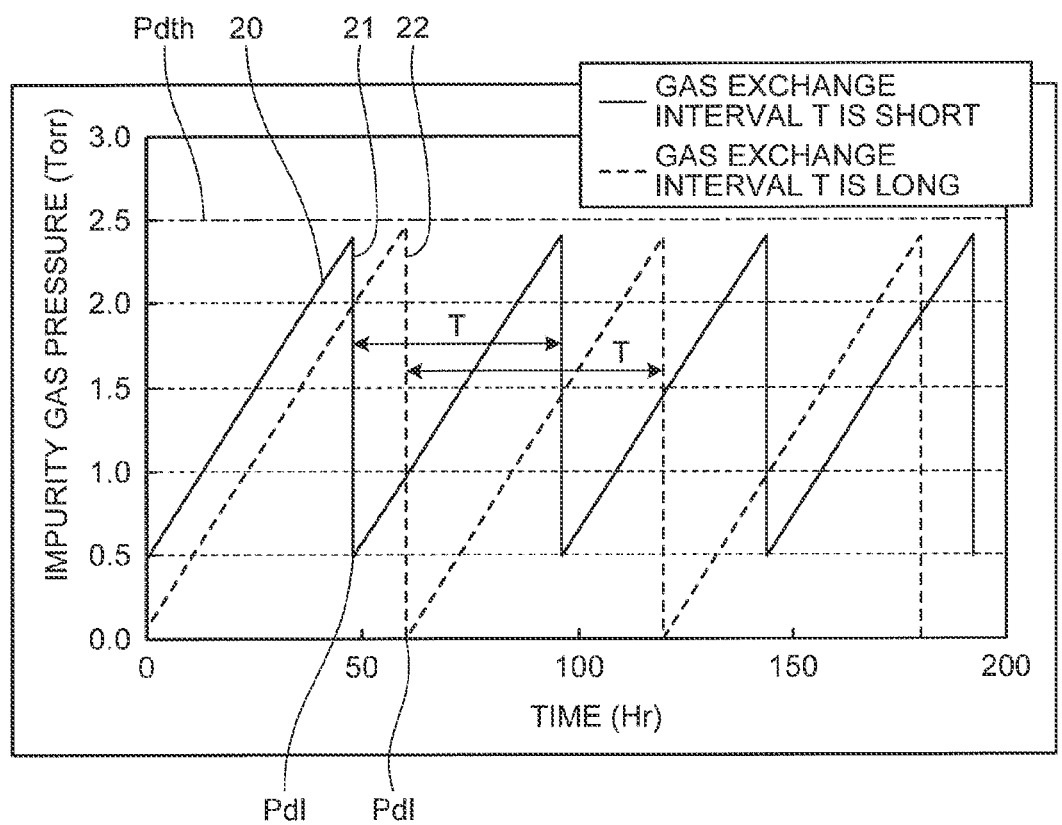
FIG. 2 is a diagram illustrating the time (Hr) variation in the amount of an impurity gas (Torr) including the time at which a gas exchange is performed.

However, in the present embodiment, as illustrated by the solid-line graph in FIG. 2, if the leakage rate L (gradient of a solid line 20) is the same as the above case, L×T can be made small by setting the gas exchange interval T to a small value. Consequently, it is possible to raise the target reached pressure Pdl of the impurity gas after evacuation at which Pd in Equation 1 satisfies Pd<Pdth. Thus, it is not necessary to perform evacuation of the vacuum vessel 7 all the way down to 0.1 to 0.01 Torrs and thus the evacuation time can be shortened.

Figure 3:
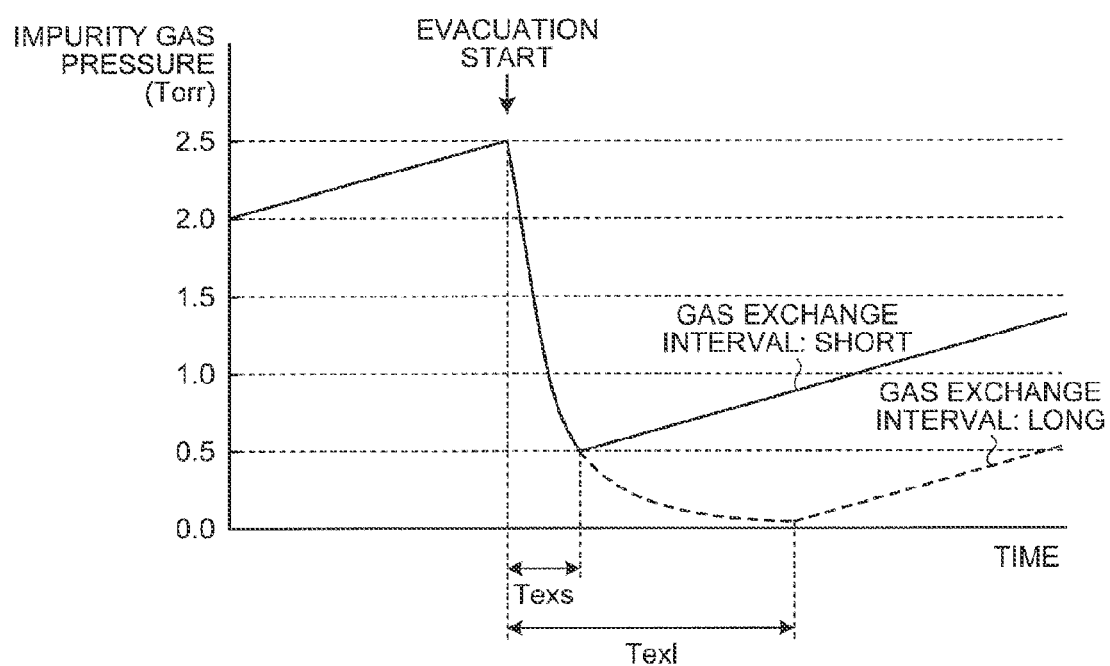
FIG. 3 is a diagram obtained by laterally shifting the solid-line graph in the case where the gas exchange interval T is short and the dotted-line graph in the case where the gas exchange interval T is long in FIG. 2 such that evacuation start time becomes the same and enlarging the graphs.

Shortening of the evacuation time by the gas exchange method in the present embodiment will be described with reference to FIG. 3. FIG. 3 is a diagram obtained by laterally shifting the solid-line graph in the case where the gas exchange interval T is short and the dotted-line graph in the case where the gas exchange interval T is long in FIG. 2 such that a solid line 21 and a dotted line 22 (evacuation start time) overlap and by enlarging the graphs.

Normally, the vacuum reached degree changes exponentially with respect to the evacuation time as illustrated in FIG. 3; therefore, a large reduction in the evacuation time (gas exchange time) can be made from Texl to Texs only by making a change in the vacuum reached degree, for example, from 0.1 to 0.5 Torrs. In FIG. 3, the vertical axis indicates the impurity gas pressure; however, the total pressure in the vacuum vessel 7 also has the same tendency.

Moreover, the leakage rate L does not normally change as long as the vacuum seal surface is not broken during maintenance or the like; therefore, it is not necessary to measure the leakage rate L every time a laser gas exchange is performed and the measured value after the maintenance may be used as an estimated value.

The laser gas exchange method according to the present embodiment will be described with reference to the flowchart illustrated in FIG. 4. First, the interval T between laser gas exchanges is determined such that it is equal to or longer than the time period for which the gas laser oscillator 1 is continuously used and is as short as possible (Step S41). For example, the interval T between laser gas exchanges is input by a user via the input terminal 18 and is stored in a storing unit (not shown) of the control unit 10.

Next, the leakage rate L is determined on the basis of the measurement result from the pressure gauge 13 or the estimated value (Step S42). The leakage rate L is also stored, for example, in the storing unit (not shown) of the control unit 10 from the pressure gauge 13 or the input terminal 18.

On the basis of the allowable impurity gas pressure Pdth stored in a similar manner to the interval T and the leakage rate L in addition to the interval T between laser gas exchanges and the leakage rate L, which are determined and are stored, for example, in the storing unit (not shown) of the control unit 10 in the above steps, the control unit 10 determines the target reached pressure Pdl of the impurity gas and the target reached pressure in the vacuum vessel 7 in accordance therewith (Step S43).

Thereafter, the control unit 10 repeats evacuation by the vacuum pump 14 and filling of the vacuum vessel 7 with the laser gas by the laser gas supply source 12 until the impurity gas pressure reaches Pdl (the inside of the vacuum vessel 7 reaches the target reached pressure) every time the interval T between laser gas exchanges elapses (Step S44). Considering it in an inverse operation manner, it is possible to determine the interval T between laser gas exchanges such that the target reached pressure Pdl of the impurity gas becomes high in accordance with the time for which the evacuation time needs to be shortened.

As described above, when the laser gas impurity decreases due to leakage from the outside of the oscillator housing, if the elapsed time from the last gas exchange is short, it is not necessary to perform evacuation of the inside of the oscillator housing all the way down to 0.1 to 0.01 Torrs. Accordingly, the evacuation time at the time of a gas exchange can be shortened by the laser gas exchange method according to the present embodiment; therefore, a gas exchange can be performed in a short time.

Second Embodiment

The configuration of the gas laser oscillator 1 in the second embodiment according to the present invention is the same as that in FIG. 1. When the gas laser oscillator 1 is used routinely and a laser gas exchange is performed, the relationship of the following Equation (2) is satisfied to cause the amount of the impurity gas in the housing (the vacuum vessel 7) after each laser gas exchange to become saturated (to maintain a steady-state value). This is the relationship required on the basis of the ratio of the impurity gas pressure before and after evacuation to the total pressure.

$$Pda = (Pda + L \times T) \times Pv/(Pl + L \times T) \quad (2)$$

where Pda (Torr) is the impurity gas pressure after a laser gas exchange, Pl (Torr) is the total pressure including a laser gas with which the housing is filled immediately after a laser gas exchange, and Pv (Torr) is the reached pressure (total pressure) in the housing after evacuation.

Furthermore, the following Equation (3) needs to be satisfied to obtain a stable laser oscillation.

$$Pdth \geq Pda + L \times T \quad (3)$$

The evacuation reached pressure Pv is changed by determining the laser gas exchange interval T so that it responds to the user's demand within the conditions that satisfy the above Equation (2) and Equation (3); therefore, the evacuation time can be optimized and shortened while maintaining the impurity gas pressure at which a stable laser oscillation can be obtained in a similar manner to the first embodiment.

Furthermore, the present invention is not limited to the above embodiments and can be variously modified at the execution stage without departing from the scope thereof. Moreover, the above-described embodiments include inventions in various stages and various inventions can also be extracted by appropriately combining a plurality of disclosed components.

For example, even if several components are omitted from all the components shown in the above embodiments, a configuration in which the several components are omitted can be extracted as an invention as long as the problem described in the section of Technical Problem can be solved and the effects described in the section of Advantageous Effects of Invention can be obtained. Furthermore, the components in the above-described embodiments may be appropriately combined.

INDUSTRIAL APPLICABILITY

As above, the gas laser oscillator and the gas exchange method for the gas laser oscillator according to the present invention are useful for a sealed gas laser oscillator and are particularly suitable for shortening the laser gas exchange time.

REFERENCE SIGNS LIST 1 gas laser oscillator
2 discharge electrode
3 gas circulation blower
4 partial reflection mirror
5 total reflection mirror
6 heat exchanger
7 vacuum vessel (airtight vessel)
8 temperature control unit
9 power panel
10 control unit
11 laser light
12 laser gas supply source
13 pressure gauge
14 vacuum pump
15, 16, 17 valve
18 input terminal
S41 to S44 Step

The invention claimed is:

1. A gas laser oscillator that is a sealed gas laser oscillator including an airtight vessel, a laser gas supply source that supplies a laser gas to the airtight vessel, and a vacuum pump that is connected to the airtight vessel and performs evacuation until a pressure of an inside of the airtight vessel reaches a target reached pressure every predetermined interval between laser gas exchanges and, and that performs laser oscillation in a state where the airtight vessel is filled with the laser gas, the gas laser oscillator comprising:
a unit that determines the target reached pressure such that the target reached pressure becomes equal to or less than a value obtained by subtracting a product of an interval between laser gas exchanges and a leakage rate of an impurity gas into the airtight vessel from an outside after evacuation from an allowable impurity gas pressure at which the gas laser oscillator is capable of being operated.

2. The gas laser oscillator according to claim 1, wherein an estimated value is used for the leakage rate.

3. The gas laser oscillator according to claim 1, further comprising a pressure gauge in the airtight vessel, wherein the leakage rate is obtained on a basis of a measurement result by the pressure gauge.

4. A gas exchange method for a gas laser oscillator that is a sealed gas laser oscillator including an airtight vessel, a laser gas supply source that supplies a laser gas to the airtight vessel, and a vacuum pump that is connected to the airtight vessel, and that performs laser oscillation in a state where the airtight vessel is filled with the laser gas, the method comprising:
a step of determining an interval between laser gas exchanges;
a step of determining a target reached pressure in the airtight vessel such that the target reached pressure becomes equal to or less than a value obtained by subtracting a product of an interval between laser gas exchanges and a leakage rate of an impurity gas into the airtight vessel from an outside after evacuation from an allowable impurity gas pressure at which the gas laser oscillator is capable of being operated;
an evacuating step of performing evacuation on the airtight vessel by the vacuum pump until the impurity gas reaches the target reached pressure every time the interval between laser gas exchanges elapses; and
a step of filling the airtight vessel with the laser gas by the laser gas supply source after the impurity gas reaches the target reached pressure in the evacuating step.

5. The gas exchange method for a gas laser oscillator according to claim 4, wherein an estimated value is used for the leakage rate.

6. The gas exchange method for a gas laser oscillator according to claim 4, wherein
a pressure gauge is included in the airtight vessel, and
the leakage rate is obtained on a basis of a measurement result by the pressure gauge.

* * * * *